(12) United States Patent
Krenkel et al.

(10) Patent No.: US 6,193,027 B1
(45) Date of Patent: Feb. 27, 2001

(54) FRICTION UNIT

(75) Inventors: Walter Krenkel, Renningen; Richard Kochendörfer, Stuttgart; Jürgen Krapf, Bernhausen, all of (DE)

(73) Assignee: Deutsches Zentrum für Luft-und Raumfahrt e.V., Bonn (DE)

( * ) Notice: Subject to any disclaimer, the term of this patent is extended or adjusted under 35 U.S.C. 154(b) by 0 days.

(21) Appl. No.: 09/077,617

(22) PCT Filed: Nov. 22, 1996

(86) PCT No.: PCT/EP96/05179

§ 371 Date: Jun. 30, 1998

§ 102(e) Date: Jun. 30, 1998

(87) PCT Pub. No.: WO97/20152

PCT Pub. Date: Jun. 5, 1997

(30) Foreign Application Priority Data

Nov. 24, 1995 (DE) ............................................. 195 43 799

(51) Int. Cl.⁷ .................................................... F16D 65/10
(52) U.S. Cl. ..................................................... 188/218 XL
(58) Field of Search .................. 188/218 XL, 218 R, 188/250 B, 251 A, 256

(56) References Cited

U.S. PATENT DOCUMENTS

| 3,391,763 | * | 7/1968 | Severson | 188/218 XL |
| 3,435,935 | * | 4/1969 | Warman | 188/218 XL |
| 3,732,953 |   | 5/1973 | Huet . |  |
| 3,899,054 | * | 8/1975 | Huntress et al. | 188/218 XL |
| 3,956,548 | * | 5/1976 | Kovac et al. | 188/251 R |
| 4,457,967 |   | 7/1984 | Chariere et al. . |  |
| 5,163,526 | * | 11/1992 | Morgun et al. | 188/218 XL |

FOREIGN PATENT DOCUMENTS

| 639 466 | | 11/1983 | (CH) . |
| 43 22 231 | | 1/1995 | (DE) . |
| 2620499 | * | 4/1976 | (FR) . |
| 2 620 499 | | 3/1989 | (FR) . |
| 1 433 090 | | 4/1976 | (GB) . |
| 1433090 | * | 4/1976 | (GB) . |
| 2 285 104 | | 6/1995 | (GB) . |
| 58-013237 | | 1/1983 | (JP) . |
| 61-157840 | | 7/1986 | (JP) . |

* cited by examiner

Primary Examiner—Douglas C. Butler
Assistant Examiner—Robert A. Siconolfi
(74) Attorney, Agent, or Firm—Fulbright & Jaworski, LLP

(57) ABSTRACT

The friction unit, in particular brake disc, has at least one friction face, with a friction element and with at least one molded unit, the friction element being made from carbon fiber-reinforced composite material and joined permanently to the molded unit. The friction unit is characterized in that the (minimum of one) molded unit (6, 13, 23, 23') is joined to the friction element (5) in such a way that at least part of it forms a region of the friction surface (7) and the molded unit (6, 13, 23, 23') has a higher thermal conductivity along the perpendiculars to the surfaces than the friction surface (7) itself.

30 Claims, 5 Drawing Sheets

FRICTION UNIT

Figure 1:
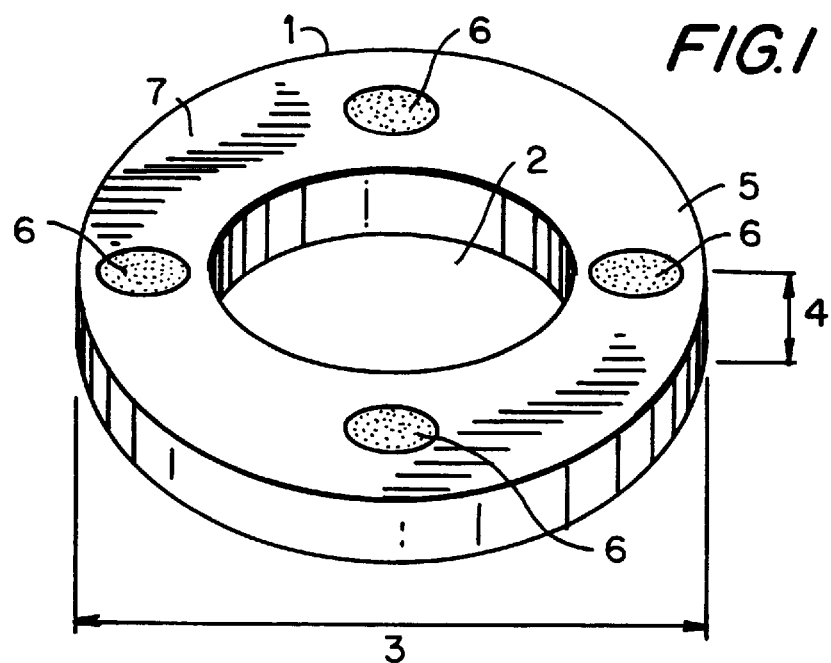

The invention at issue concerns a friction unit, in particular a brake disk, which shows at least a plane of friction with a friction body and with at least a molded body, where the friction body is build of carbon-fiber reinforced composite materials and is strongly joined together with the molded body.

A friction unit of this type is described in the DE-A1 44 38 456. This friction unit is identified by a core and at least one of these composite friction bodies, where the friction body and the core are fastened to the back side of the plane of friction. The blending of both parts is achieved by a high-temperature tolerance composite sheet. Preferably the composite sheet is made of silicon carbide. An essential problem on such brake disks, or rather brake disks in general, is the sufficient dispersion of the generated heat from the plane of friction. For this reason, the core of these brake disks has hollow spaces that allow sufficient cool air to be conducted to the insides of the friction part. As a result of the cooling channels and hollow spaces, a large surface is provided to convey the heat to the surrounding air. In a completed assembly, a space is kept between two friction parts through a core, built of planks, where a hollow space is created between the planks. The planks are set in the grooves of the inner side of the particular friction part inserted and held to the friction part.

Based on the above described state of the art, the invention at issue addresses the underlying object to further build a friction unit, in particular a brake disk, where the heat generated on the plane of friction is removed more effectively compared to known systems.

This objective is achieved by a friction unit according to the invention, in which at least one molded body is joined to the friction body so that at least a section becomes part of the plane of friction, and the molded body, in the perpendicular direction to surface, shows a higher heat transmission than the plane of friction itself.

In accordance with the teachings of the invention, which, for one, are comprised in that the molded bodies reach the surface of the plane of friction of the friction body, but also, in that the molded bodies show a preferred heat transmission direction, and, by these, the heat transmission direction is so oriented that, in essence, it is the direction that the perpendicular plane to the plane of friction extends, with the result, on account of defined heat gradients over these molded bodies, that the resulting heat generated in the plane of friction is removed to prevent a heat buildup on the plane of friction. The friction surface areas, which are not made of the particular molded body endings on the plane of friction, can be optimized based on the friction coefficients, so that the brake disks show good friction characteristics in these areas, and also exhibit a good removal of the heat through the molded bodies. This fast removal of the heat is particularly essential, since, with increased temperature on the friction surface, the friction characteristics of the friction unit are reduced significantly. In addition, locking can increase with increasing plane of friction temperatures, which can be minimized in accordance with the invented measures.

The molded bodies are mainly made of a carbon-fiber reinforced laminated material, that is, from a material specified or equal to the friction body. In the development of such a molded body the carbon-fibers are oriented in such way, in contrast to the building of the actual friction body, that at least 50% of the molded body carbon fibers are aligned longitudinal to the surface of the friction body, so that its longitudinal axis and the surface perpendicular to the plane of friction enclose a $\leq 45°$ angle; the carbon-fibers in the friction body should essentially run parallel to the friction surface. Preferably the angle between the perpendicular surface and the longitudinal axis of the fibers of the molded bodies amount to <30, but preferably maximum 10°; these fibers would in the ideal case wind up vertical to the friction surface or parallel to the surface perpendicular to the plane of friction. The proportion of fibers proceeding vertically to the surface, or rather, in the direction of the perpendicular surface comprise more than 75%; this proportion is preferably over 90%. In the ideal plate, the molded bodies are formed of fiber bundles, the fibers being arranged together in parallel and oriented in the direction perpendicular to, or at least extended to, the surface area of the plane of friction.

To obtain a stable structure with a good heat compartment, the molded bodies should extend through the entire thickness of the friction body. A multitude of molded bodies should be comprehended, which, as described above, are integrated into the friction body. These individual molded bodies are spaced equally from one another, so that between the surface of the molded bodies which end on the plane of friction, sufficient surface area and corresponding friction qualities are preserved. In such an arrangement of the molded bodies, bolt-like made molded bodies are preferred, which have a frontal surface ending in the plane of friction. Preferably the total of the frontal surface of the molded body on the plane of friction of a single molded body should be between 30 and 50% of the total surface of the plane of friction in the friction unit. The diameter of the bolts, or rather, for the diameter of the frontal surface of the molded bodies ending in the plane of friction, diameters of 10 up to 20 mm, preferable between 12 and 14 mm, are to be selected.

The molded bodies can be modified according to assembly, and insertion can protrude through the friction body, or rather, the friction unit, which has an additional advantage, in that the free surface of the molded body protruding through the plane of friction increases the cooling.

The bolt-like molded bodies can taper from the plane of friction to the plane of friction of the opposite surface. This means that such molded bodies, as viewed from the plane of friction, are set in tapered openings. Such an assembly has among others, the advantage that the molded bodies are also held in the friction body wedged under higher heat effects through the tapered, for instance, conical, cross section. As far as the gradation of cross section, if it widens or tapers, shoulders or impact surface can be made, which in turn guarantee a secure position or orientation to each other of the molded bodies and the friction bodies. From a finishing technician's view, the molded bodies show a somewhat round cross section. In such a cross section fiber, bundles can be compactly fastened, with an equal, radial distributed orientation.

As previously indicated, molded bodies are preferred such that a shoulder or fastening surface is shown. Two friction bodies can be spaced and jointly oriented with molded bodies made this way, so that the shoulder area of the molded bodies in relation to the friction body, which it supports, serves as a surface for placing of the backside of the opposite friction body on the friction surface. The area, or rather the hollow area formed between both friction bodies by the molded body can be used in such way, that, when the friction unit is turned a strong air circulation can be achieved in the hollow areas and heat can be removed therethrough.

To achieve the heat transfer to the surface of the molded bodies, which are in the middle reach of the respective molded bodies, which lies free between the space of both friction bodies, the carbon-fibers are arranged in such manner, that they are essentially arranged in a level perpendicular to the lengthwise direction of the fiber, which runs along the friction surface boundary, and thereby perpendicular to a cooling current. The course of the fibers are accordingly reverse-oriented from the friction surface to the free surface in the middle range of the molded bodies, so that an optimal heat drainage can be achieved, namely using a forward direction of the heat transmission along the fibers. A uniform distance of the molded body in envisioned using an internally aired brake disk, where the molded bodies can also be ordered in such a way, as to form the walls of cooling channels.

In the in-between space between two friction units, which spaced under a defined distance, for instance according to the invention molded bodies, additional molded bodies can be added, which protrude from the plane of friction into this space. Such molded bodies serve to the removal of heat from the friction surface. The dimension can be made appropriate and be made as hollow entities, where attention must be paid that in the area of the plane of friction the fibers run mainly perpendicular, while in the area of free space, to appropriately remove the heat, the orientation be in the direction of the cool stream, which passes the form plates.

In accordance with the teachings of the invented molded bodies, the friction unit can also find a preferred application as support parts or thrust transmission element.

In the event that molded bodies show sufficient cross section, it can show more hollow spaces on the obtained side, in order to increase the free surface for the heat removal. They can also exist as pipe or tube like form with one opening essentially perpendicular to the plane of friction.

To further increase the heat transmission of the form plates, metal is layered on the molded bodies. Such metal pieces, for instance thin shavings or metal wires or—fibers, are aligned to extend perpendicular to the plane of friction in the molded bodies. The metal insert is aimed parallel to the fibers in connection with the preferred orientation of the carbon fiber.

Alternative to the metal insert, or in addition to it, for the increase of the preferred heat conduction, at least 50% of the carbon fibers of the molded bodies, selected as those of which the friction body is constructed, have a higher heat conductive capacity. Such fibers come as high-module fibers with a pull-E-modulus total greater than 300 GPa on polyacrilnitril-(PAN-) or Pechbasis.

According with the teachings of the invention, the friction unit is preferably built of a carbon-fiber body with a particular, preferred orientation of the fibers in the area of the friction body and the molded bodies, where the fibers of the friction body and/or the molded body in an additional, preferred development are embedded in silicon carbide. During the production of the friction unit, this silicon carbide is modified in form from liquid silicon infiltrated in a micro structure in the area of the prepared carbon-fiber frame, and under heat input with a free carbon-fiber, is changed to silicon carbide. Under these conditions it is possible to prepare a porous substrate as a blank, with a particular enclosed orientation of the friction bodies and molded bodies, after which the unit is completed with the infiltration of silicon and the heat handling, to a composite.

Under the concept the friction unit, as it is herewith used, does not only mean brake disks and brake pads, but also friction linings, as for clutches, or similar devices.

Figure 2:
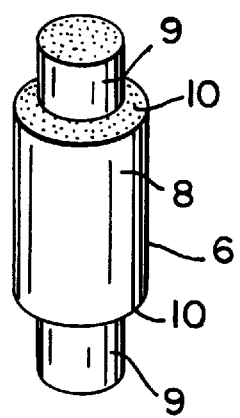
Figure 3:
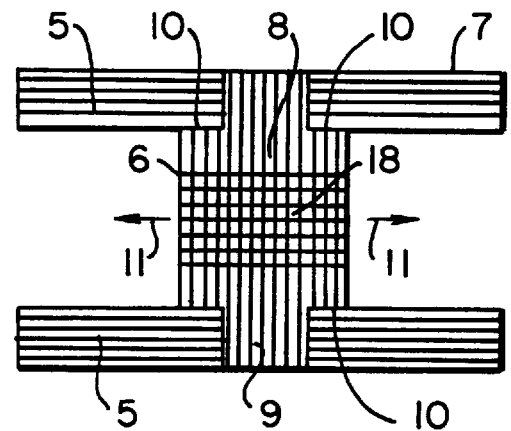
Figure 4:
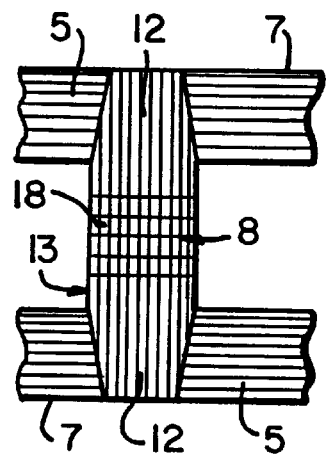
Figure 5:
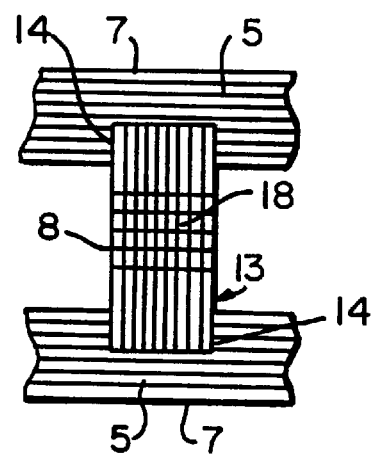
Figure 6:
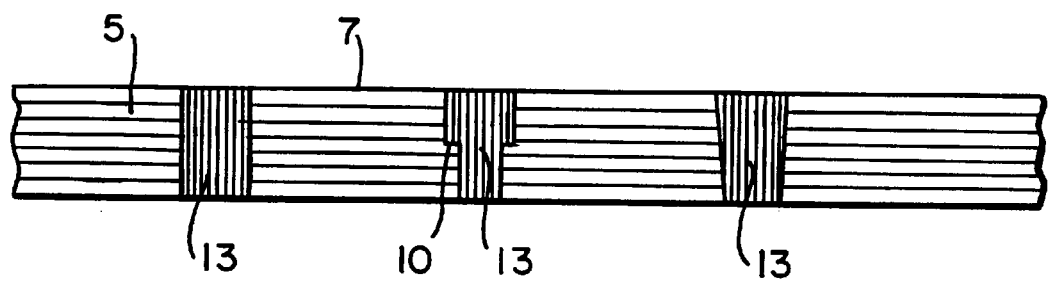
Figure 7:
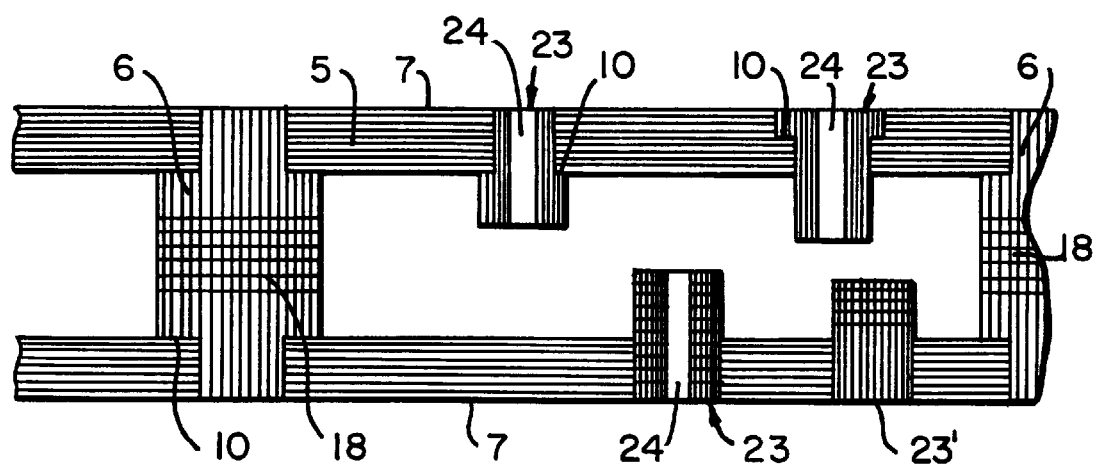
Figure 8:
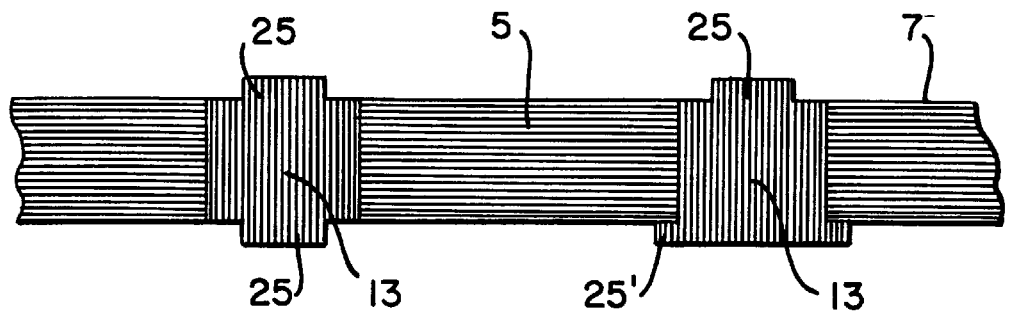
Figure 11A:
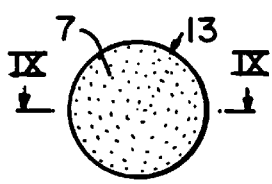
Figure 12A:
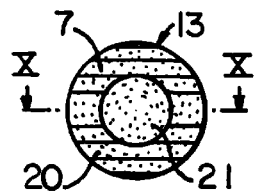
Figure 11B:
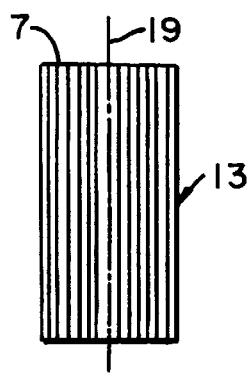
Figure 12B:
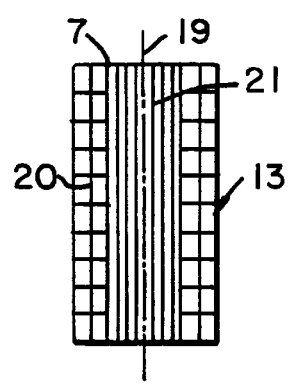
Figure 13:
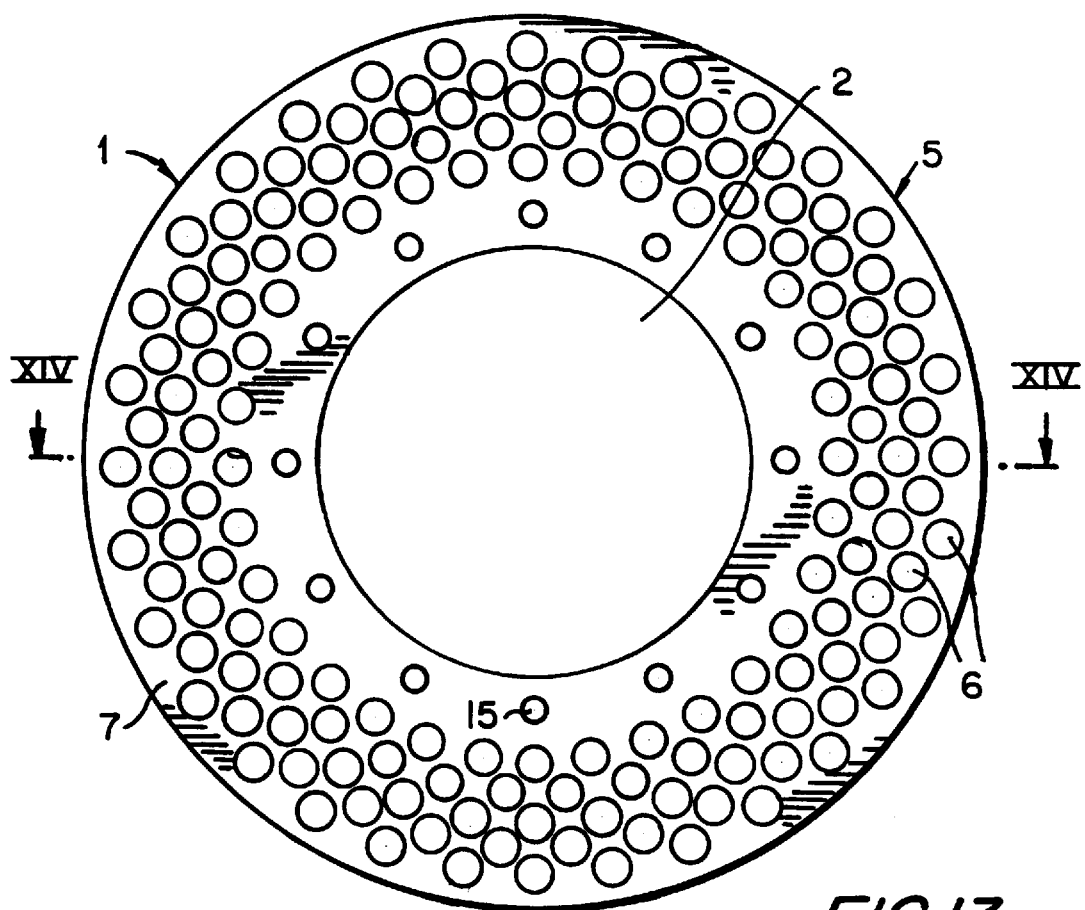
Figure 14:
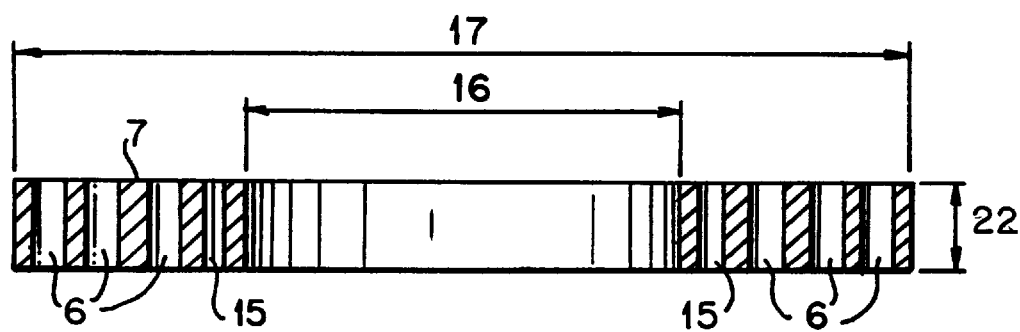

Additional details and characteristics of the invention result from the following description of attached implemented examples. The figures show:

FIG. 1: a perspective, schematic view of a friction unit, where four molded bodies end in the area of the plane of friction, FIG. 2: a perspective view of a molded body, as it is placed in relation to the friction unit in the figure, FIG. 3: a section through two friction units, which are with one molded bodies, as described in FIG. 2, spaced when held together, FIG. 4: a view as in FIG. 3, wherein a molded body tempered cross sectional contour to plane of friction is shown, FIG. 5: a molded body, which can be inserted as spacer, FIG. 6: schematic of a longitudinal section through a friction unit with a single friction body, where different molded bodies are shown, FIG. 7: a cross section corresponding to FIG. 3 through two friction units with two molded bodies which keep the friction units at a distance, as well as added cooling-molded bodies, which protrude into the hollow space from the plane of friction, FIG. 8: a view similar to FIG. 6, where two variations of molded bodies are described, which protrude from the plane of friction, FIGS.: 9A through 12A, as well as FIGS. 9B through 12B, at the same in a frontal top view, as well as a section corresponding to the indicated sectional lines, molded bodies with schematic presentation of fiber direction, to clarify the invention in accordance with the teachings of the invention as well as different variation possibilities FIG. 13: a top view of a standard brake disk in according with the teachings of its invention, and FIG. 14: a section along the section line XIII—XIII in FIG. 13.

In FIG. 1 a schematic friction unit in the shape of a brake disk is described, which is assembled in the form of a ring with a central opening 2. Typically such a brake disc has an outer diameter 3 of approximately 300 up to 350 mm, while the thickness 4 is between 8 and 15 mm.

The brake disk 1 encloses a friction body 5 with carbon-fiber reinforced composite as well as different, bolt-like molded bodies 6 inserted in the friction body 5 and distributed equally around the circumference of the brake disk 1. These molded bodies 6 end with a frontal surface in the plane of friction 7 of the friction bodies 5 and comprise part of the plane of friction, as is seen in FIG. 1. These molded bodies 6 reach from the top surface of the friction body 5, that is from the plane of friction 7 on up to the opposite plane of friction top surface of the friction body 5. The molded bodies, which in the depicted example are made of a carbon fiber frame, serve the purpose of heat removal generated on the plane of friction 7 during braking, through a preferred heat transmission orientation. For this reason the molded bodies 6 are given a preferred heat conducting direction, by orienting the molded bodies in such a way that these molded bodies, preferably obtained as carbon fibers with a high portion volume, in the area of the molded body 6 generate a small heat sink, and the heat targeted is removed through these molded bodies 6. While the fiber orientation in the friction body 5 is assembled in such way, for instance, produced from a carbon fiber frame, that it possess a high strength, that is, the fibers run essentially parallel to the plane of friction 7, the fibers of the bolt-like molded bodies 6 are arranged perpendicular to the plane of friction 7, that is, essentially in direction of the upright perpendicular surface. It has been shown that particularly such a defined fiber orientation in the direction of the perpendicular surface leads to an optimum removal of heat from the plane of friction 7. In FIG. 1, to clarify the primary assembly of the friction unit, only four bolt-like molded bodies 6 are described; nonetheless, for the optimum assembly of the brake disk, a number of bolt-like molded bodies 6 is to the advantage, as is described in FIGS. 13 and 14, which will be explained subsequently.

To produce a top performance friction unit, or rather a top performance brake disk, two friction bodies 5, as are primarily described in FIG. 1, are arranged with space between them, as is shown in FIG. 3. In order to maintain the space the bolt-like molded bodies 6 can be used between both friction bodies 5, which has been explained in the attached FIG. 1. In a released assembly, as is described in FIGS. 2 and 3, a center part 8 is assembled with tapered end cuts 9, for instance a cylindrical form (FIG. 2), in such way, that a shoulder area 19 results at the junction between the center part 8 and the end cut 9. The upper and lower friction body 5 rest on the particular shoulder area 10, as is shown in FIG. 3.

The principal fiber orientation in particular friction bodies 5 as well as in molded bodies 6 is shown in FIG. 3. While in the particular end segment 9 the fibers end perpendicular to the plane of friction 7, that is, in the direction perpendicular to the surface of the plane of friction 7, and this orientation reaches into the center part 8 of the molded bodies 6, in the central zone the preferred fiber orientation is aligned perpendicular to this first fiber, that is somewhat parallel to the plane of friction 7, as is indicated by the corresponding hatch 18. As a result of this fiber orientation follows a preferred heat flow in the direction of the referenced columns 11, in particular, also, so that cool air flows towards the molded bodies 6 during turning of the friction unit. A preferred assembly of such a friction unit is then given, where the friction body 5 as well as the bolt-like molded bodies 6 are assembled of a carbon fiber frame, with orientation of the fibers in particular in the molded body 6 in such way, as indicated, where these molded bodies are produced as blank carbon fiber frame and infiltered with liquefied silicon, which is then transformed under heat treatment with free carbon, to silicon carbide. Following the ceramic-bake, a high strength brake unit is achieved, which is dedicated to the demand as high performance brake units where high temperatures are generated on the plane of friction 7, but which yield a particular high degree of heat removal due to the special production of the molded bodies 6. For the assembly of molded bodies 6 highly heat conductive fibers are mainly used, such as High module fibers, which are identified through a heat conductive tolerance grater than 20 W/mK. These fibers of the plane of friction consist mainly of high strung HT-(High Tenacity)-C-fibers with a E-modulus <300 GPa, which, for instance, are present as a bi-directional mesh.

In FIG. 4 a molded body 13 is shown, which in place of a step-like tapered end cut 9 of the molded body of FIG. 3, terminates with a free end, which terminates at the plane of friction 7, and shows a conical tapered cut 12, which fits into a corresponding, conical cut in the particular friction body 5. With this arrangement, a secure hold of the particular molded body 6 in the friction body 5 is also guaranteed. In contrast to the molded body of FIG. 3, the molded body 13 in the released assembly according to FIG. 4 has the advantage that the crossing between the conical segment 12 and the center part 8 is quasi-continuous, that is, it is not available as a springboard in form of a shoulder area 10. This arrangement has the advantage that the fibers in the conical segment 12 go over the center part 8 and are reverse oriented in such way that they then flow perpendicular to the orientation in area of the conical segment 12, as was explained in the example of FIG. 3.

A molded body is shown in FIG. 5 that serves as an additional spacer between both friction bodies 5; these molded bodies are set in corresponding depressions or grooves on opposite planes of friction 7 of the friction body. Also the fiber orientation in the center part 8 can be changed (item 18) in such molded bodies 13 to orient the fibers in the direction of the cool air, corresponding again to FIG. 3, to influence the heat removal direction, or rather, the heat gradient.

Under the concept "changed orientation" as used in the preceding section and to be used in the subsequent sections, is to be understood, that the modified, new preferred orientation is given to the fibers of molded bodies 6, 13.

The cross section of the molded bodies 13, as presented in FIGS. 4 and 5, can be assembled in a flow-advantageous cross section profile, preferably in the flow direction of the passing cool air during turning of the friction body 5, so that large air masses are carried over the molded body 13 surface to be cooled.

While attached FIGS. 2 to 5 explain the arrangement where two friction bodies 5 through the molded bodies 6, 13 assemble a double disk friction unit, a section of a further friction unit, or rather a friction body 5 schematic is presented in FIG. 6, which corresponds to a brake disk, as show in FIG. 1.

Different molded bodies 13 are shown in attached FIG. 6, which are set in corresponding drilled spaces of the friction body 5. The molded body 13 on the left contains a cross section equal to its length, where the fibers, of which this molded body 13 is assembled, are oriented perpendicular to the plane of friction 7, that is, in direction perpendicular to the surface of the plane of friction 7. The central molded bodies 13 according to FIG. 6 contain an upper and lower cut with a shoulder area 10, with which it leans against the inner side of the friction body. The right presentation of a molded bodies 13 shows tapered cones from one plane of friction 7 to the opposing side of another, which in comparison to the center molded body 13 has the advantage that it is held securely in the friction body 5.

The single molded bodies can not only show circular cross sections, but the cross sections are fit to the particular design, mainly in consideration of the orientation of the fiber in reference to the preferred heat conduction.

A friction unit which corresponds to FIG. 3 is schematically presented in FIG. 7. In this arrangement two friction bodies 5 are also spaced by molded bodies 6 that correspond to molded bodies in FIG. 2, so that between both friction bodies 5 a space is established. Between both molded bodies 6 in the arrangement of FIG. 7 additional cooling spacers 23, 23' are added, which only protrude a given distance over the underside of the particular friction body 5, in which they are set.

These cooling spacers 23, 23' serve only to remove the heat from the plane of friction, where again their fiber orientation essentially perpendicular to the plane of friction 7 serves to the advantage that a preferred heat transmission direction is achieved. To this purpose each cooling spacer 23 has a central insertion hole 24, which can be enlarged to one surface of the cooling spacer 23, and receive to the other surface friction material from the plane of friction 7. Such cooling spacers 23 can in principle be assembled in such way, as explained in the attached description of molded body 6, 13, or rather, as explained in the following attached FIGS. 9 to 12. By example shoulder areas 10 are comprehended, with which the cooling spacers 23 are placed against the friction bodies 5. The possibility also exists to build the molded body 23 as bolts or rather cylindrical parts underneath the area of friction body 5, as explained for cooling spacer 23 in FIG. 7. As additional variations the molded body 23 is presented as massive molded body.

A friction body 5 corresponding to the description in FIG. 6 is shown in FIG. 8, in which bolt-like molded bodies 13, that essentially correspond to the molded bodies 13 in FIG. 6, are set. In addition, a taper protrusion 25, which protrudes over the plane of friction 7, is shown. With such an arrangement, an additional cooling effect can be achieved. This protrusion 25 can not only protrude over the upper side of the friction body 5, as the right molded body 13 is shown, but also over the underside of the friction body 5, as the left description shows. In addition the right molded body 13 of FIG. 8 on the lower end shows a wider protrusion 25, that lies in the lower surface of the friction body 5. The protrusion 25 and 25', in particular protrusion 25, which extends past the plane of friction 7, can be set in as stop parts or thrust transmission elements, whereby corresponding composite means in these molded bodies can be made. For such measures it is not necessary for the protrusion to be tapered, as presented in FIG. 8, but a limited projection out over the plane of friction 7 is sufficient. In addition the free end of such a protrusion 25, 25' can also serve to build the actual plane of friction. For this, a determined number of molded bodies which contain frontal sides is envisioned, which project out over the actual plane of friction 7, as described in FIG. 8. Such a measure has the particular advantage that a small split is made between the upper surface of plane of friction 5 and the free frontal surface through which cool air circulates, which increases the cooling of the friction unit 5.

Various arrangements of molded bodies in bolt-like, that is, with generally circular cross sections, are presented in FIGS. 9 to 12 that, for instance, correspond to the left molded body 13 of FIG. 6.

Figure 9A:
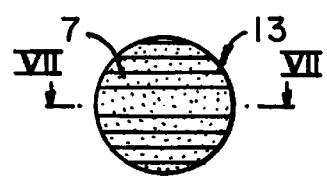
Figure 9B:
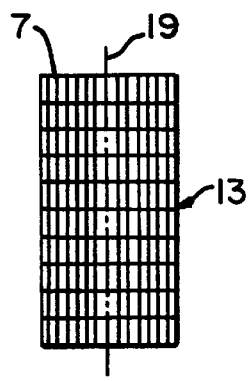

A molded body 13 is presented in FIG. 9B which is made of a two-dimensional mesh, assembled over the cross section of single layers as shown in FIG. 9A. The fibers run along 0 and 90 degrees to the longitudinal axis identified in the figures with the broken lines 19. The forward direction of the carbon-fibers running along the direction of axis 19 is seen in the nature of this molded body 13, while a somewhat equal greater part is arranged across it. An equal heat transfer results as well in the direction of axis 19 as of the friction surface.

Figure 10A:
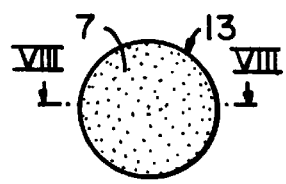
Figure 10B:
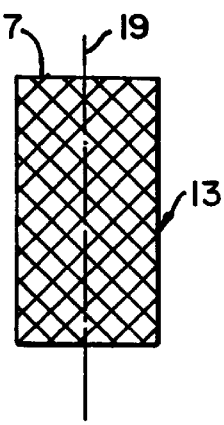

A molded body 13 is shown in FIGS. 10A and 10B, which are made of a two-dimensional fiber mesh, that for instance was wrapped with axis 19 as the center.

As FIG. 9A schematically shows, the end of the fibers terminate on the friction surface, so that heat generated on the friction surface is removed to the opposite side up through the defined orientation of the fibers under the angle of 45 degrees to the axis 18. The advantage to this arrangement is that all the fibers in the longitudinal direction, as well as across, remove heat at the same time.

FIGS. 11A and 11B show an assembly, where fibers are only longitudinal to the axis 19. This corresponds to a quasi-fiber bundle, in which the fibers together are oriented in parallel, running perpendicular to the friction surface.

FIGS. 12A and 12B show a variation with an outer coat identified as 20, and a core 21. The fibers are aligned according to FIG. 11A and 11B in the core 21 parallel to the axis 19, while the coat 20 is formed of a two dimensional fiber mesh according to the assembly of FIGS. 9A and 9b. A decreasing heat gradient to the axis 19 and plane of friction 7 away to the opposite side is achieved with this assembly of molded bodies 14, so that the heat is removed from the friction side 7 across the longitudinal axis 19.

While FIGS. 1 to 12 show a schematic description of brake disks and molded bodies, a standard brake disk 1 with a single friction body 5 is presented in FIGS. 13 and 14. This brake disk 1 contains a central receiving opening, corresponding to the description of FIG. 1. Furthermore, attachment holes 15 are equally distributed near the edges of the central opening 2 with which the brake disk can be fastened to a single unit. The friction body 5 contains a equal pattern of five rows of plate spaces, corresponding to FIG. 1 reference 6, where the molded bodies 6 in each individual row are set back and ordered in a radial direction so that a smaller piece of the actual friction body is left between neighboring molded bodies 6. These molded bodies 6 can, for instance, show a cross section, as is shown in FIG. 6, where corresponding FIG. 14 bolt-like molded bodies 6 are shown, which over their axial length have a similar cross section. These molded bodies 6 have also a preferred direction for heat transmission which gives rise through a fiber orientation of a carbon fiber assembled brake disk, that is, the fiber orientation of molded body 6 again run perpendicular to the plane of friction 7. The molded bodies, through the fine distributed assembly of individual molded bodies 6, are distributed over the overall surface, in order to remove from the inner brake disk the heat which is generated on the plane of friction 7 during the braking. The plane of friction 7 not made of plane spacers 6, can be laid out to have optimal friction properties, while the molded body is laid out such, that they guarantee an optimal heat removal, in that they form heat sinks. A preferred structure of this form, as presented in FIG. 13, is preferably made in the shape of a fiber framework for the friction body 5, in which the individual bolt-like molded bodies 6 are embedded and have a two dimensional mesh analogous to FIG. 9 in structure, which run parallel to the perpendicular surface of the plane of friction 7. Such a carbon-fiber matrix with the defined orientation of the fibers can be made in the shape of a blank, which subsequently, under previous assembly of a defined microstructure, can be infiltrated with liquefied silicon, which then changes to carbide with free carbon.

Following baking, a high strength carbon composite results, tolerant of high temperature, that at the same time brings with it an optimal heat transmission from the friction surface. To support such a heat removal from the plane of friction 7, the good heat transmission of inserted molded bodies 7 can be envisioned, for instance, in the shape of metal wires or metal shavings, which are not shown in the figures.

Individual or all molded bodies 6, which are set in the friction bodies 5, can be provided with a passage opening in order to, on one side, achieve an additional cooling effect and, on the other, to obtain empty spaces through which the friction generated on the plane of friction 7 can be removed.

The brake disk 1, as shown in FIGS. 13 and 15, has a diameter 16 of the central opening of approximately 16 mm, while the outside diameter 17 is approximately 330 mm. The thickness 22 of the brake disk 1 or, rather, of the friction body 5 is about 30 to 35 mm. For the diameter of the fastening holes 15, 10 mm was selected. The diameter of the bolt-like molded bodies 6 amount to 13 mm, where 160 such bolts are set in the friction bodies.

The various molded bodies 6, 13, 23 and 23', as they are explained in the preceding description, must fulfill the function, one in the direction perpendicular to the surface of the plane of friction to reach a higher heat transmission than the material of the same plane of friction, to achieve the removal of heat from the plane of friction. To achieve such an effect, various assemblies for the molded bodies are offered, as for instance molded bodies of carbon-fiber reinforced composites, the addition of metal inserts in the molded bodies, as well as molded bodies, whose carbon fiber are embedded in silicon carbide, which is made from infusion of liquid silicon and reaction with carbon. An additional possibility is the massive development of molded bodies of carbon, mainly graphite, or of non reinforced monolithic material, mainly silicon carbide, or rather sintered silicon carbide or of with silicon infiltrated silicon carbide. From the resulting materials monolithic ceramics should be implemented in a specific application for such molded bodies, when additionally a wear and tear decrease is strived for, while form plates, which essentially are part carbon, especially graphite, serve to reduce the noise; from this perspective form plates of graphite are also made cost effectively, and finally is its heat transmission can be selected, so that the desired heat gradient in the range of the molded body is achieved. Also the molded bodies 6, for instance, as are depicted in the brake disk of FIG. 13, in part, can also be made of graphite in order to achieve the noise muffling effect, while being in part made of monolithic ceramic in order to generate lock resistance. Additionally, the form plates 6 corresponding to the release assembly of FIG. 13 can be arranged in such a way, that the channels made by the molded bodies make a cooling channel system, through which a defined cooling fluid, for instance the surrounding air, is conveyed.

What is claimed is:

1. Friction unit, which, at least, shows a plane of friction with a friction body and with at least a molded body, where the friction body is build of carbon-fiber reinforced composite materials and is strongly joined together with the molded body, and where at least one molded body is joined to the friction body in such a manner that at least a section becomes part of the plane of friction and the molded body, in the perpendicular direction to the plane of friction, shows a higher heat transmission than the plane of friction itself, and in which the molded body is made of carbon fiber reinforced composite, in which at least 50% of the carbon fibers of the molded body are arranged in the longitudinal direction, so as to encompass an angle with the surface perpendicular to the plane of friction of ≦45°, and in which the carbon fibers of the friction body essentially run parallel to the plane of friction.

2. A friction unit according to claim 1, in which the angle amounts to <30°.

3. A friction unit according to claim 1, in which the included angle amounts to <10°.

4. A friction unit according to claim 1, in which the carbon fibers of the molded body run in proximity to the surface perpendicular to the plane of friction.

5. A friction unit according to claim 1, in which the portion of the oriented carbon fibers at the molded bodies amount to more than 75%.

6. A friction unit according to claim 1, in which the portion of the oriented carbon fibers of the molded bodies amount to more than 90%.

7. A friction unit according to claim 1, in which the total carbon fibers of the molded body run in close proximity, parallel, and in the direction of the surface perpendicular to the plane of friction.

8. A friction unit according to claim 1, in which the molded bodies penetrate the entire thickness of the friction body.

9. A friction unit according to claim 1, in which several molded bodies are provided and which are distributed with distance to each other throughout the friction body.

10. A friction unit according to claim 1, in which the molded bodies are each made with a frontal surface laying flush on the plane of friction.

11. A friction unit according to claim 1, in which the molded bodies are each made with a frontal surface protruding over the plane of friction.

12. A friction unit according to claim 1, in which the molded bodies taper from the plane of friction to the surface laying opposite to said plane of friction.

13. A friction unit according to claim 12, in which the molded bodies are made in form of conical elements.

14. A friction unit according to claim 12, in which the molded bodies have stopping faces.

15. A friction unit according to claim 1, in which the molded bodies have a circular cross section.

16. A friction unit according to claim 1, in which at least one molded body protrudes over the surface which surface is the surface opposite to the friction surface and where an additional friction body is attached on the protruding part of the molded body.

17. A friction unit according to claim 16, in which the molded bodies are holding both friction bodies in such a manner that a space between both friction bodies is created.

18. A friction unit according to claim 17, in which, in the area of the molded bodies, which bridges the space between both friction bodies, the carbon fibers are arranged in such way, that they essentially run in a plane perpendicular to the fibers which run along the adjacent layer of the plane of friction and in direction of a cooling stream.

19. A friction unit according to claim 1, in which at least an additionally molded body projects in the space between the both friction bodies.

20. A friction unit according to claim 1, in which the molded bodies are made as hollow parts.

21. A friction unit according to claim 1, in which the molded bodies contain at least a metal inlay which extending as a layer essentially perpendicular to the plane of friction.

22. A friction unit according to claim 1, in which at least a metal inlay is arranged in such way that it essentially runs parallel to the carbon fibers of the molded bodies.

23. A friction unit according to claim 1, in which at least 50% of the carbon fibers of the molded bodies show a higher heat transmission capability than the carbon fibers of the friction body.

24. A friction unit according to claim 1, in which at least 50% of the carbon fibers of the plate-spacers are High Module Fibers with a pull-E-Modulus >300 GPa.

25. A friction unit according to claim 1, in which the carbon fibers of the friction body and/or the molded body are embedded in a silicon carbide, which is built up by infiltrated liquid silicon and reaction of the silicon with carbon.

26. A friction unit according to claim 1, in which the sum of the planes of frontal surfaces of the molded bodies ending in the plane of friction comprise approximately 30 to 50% of the total surface of the plane of friction.

27. A friction unit according to claim 1, in which the diameter of the frontal surface of the molded body ending in the plane of friction amounts between 10 and 20 mm.

28. A friction unit according to claim 1, in which the number of molded bodies, their shape and positioning has been selected in such a manner that a cooling channel structure is built up by the molded bodies.

29. A friction unit according to claim 1, in which the molded bodies form support parts and/or power transmission elements.

30. A friction unit according to claim 1, in which the molded bodies protrude over the upper side of the respective friction body and the frontal surfaces of the molded bodies form a plane of friction.

* * * * *